Sept. 2, 1952 H. J. CRINER 2,608,998
AUTOMATIC SHUTOFF VALVE
Filed Sept. 22, 1949 2 SHEETS—SHEET 2

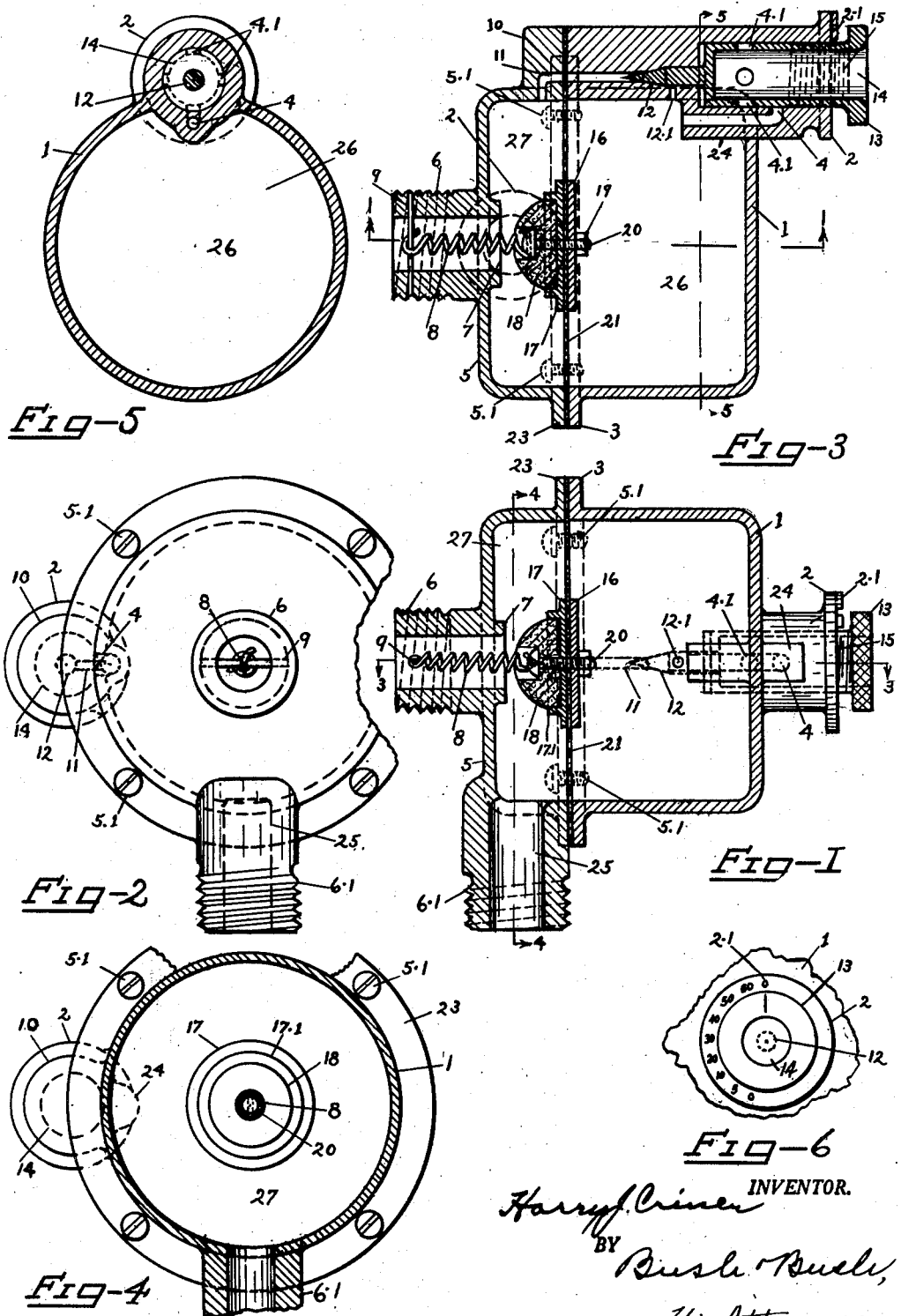

Harry J. Criner INVENTOR.
BY
Bush Bush
His Attorneys.

Patented Sept. 2, 1952

2,608,998

UNITED STATES PATENT OFFICE 2,608,998

AUTOMATIC SHUTOFF VALVE

Harry J. Criner, Davenport, Iowa, assignor of one-half to A. G. Bush, Davenport, Iowa Application September 22, 1949, Serial No. 117,245

10 Claims. (Cl. 137—672)

My invention relates to an improvement in automatic shut-off valves to control the flow of water in a hose or pipe. The objects of my improvement are to provide a simple economically constructed valve which can be mounted in series in a water supply pipe or garden hose used for sprinkling lawns and other purposes, and which can be manually adjusted so as to automatically close and cut off the flow of water at the expiration of a predetermined period of time; to provide such a valve which can be inserted in series between two successive lengths of garden hose or between the water supply pipe for a residence and a garden hose used in connection therewith; to provide such a valve mechanism which will be free from gearing and be simple and durable, can be constructed economically and installed readily by unskilled persons and which can be easily cleaned and repaired without special tools.

My apparatus comprises a preferably cylindrical housing containing two chambers separated by a flexible diaphragm, one of which chambers constitutes a channel or flow chamber for the passage or flow of water therethrough and the other chamber constitutes a reservoir arranged to receive a supply of water from the flow chamber sufficient to equalize the water pressure on both sides of the diaphragm; also to provide manually operable means for draining the reservoir.

I accomplish these objects by the means shown in the accompanying drawings, in which:

Figure 1 is a horizontal section on the middle line of Figure 3;

Figure 2 is an end elevation of Figure 1 from the left;

Figure 3 is a sectional view on the line 3—3 of Figure 1;

Figure 4 is a sectional view on the line 4—4 of Figure 1 with parts broken away;

Figure 5 is a sectional view on the line 5—5 of Figure 3;

Figure 6 is a detail showing the arrangement of the dial 2.1;

Similar numerals refer to similar parts throughout the several views.

Figure 7:
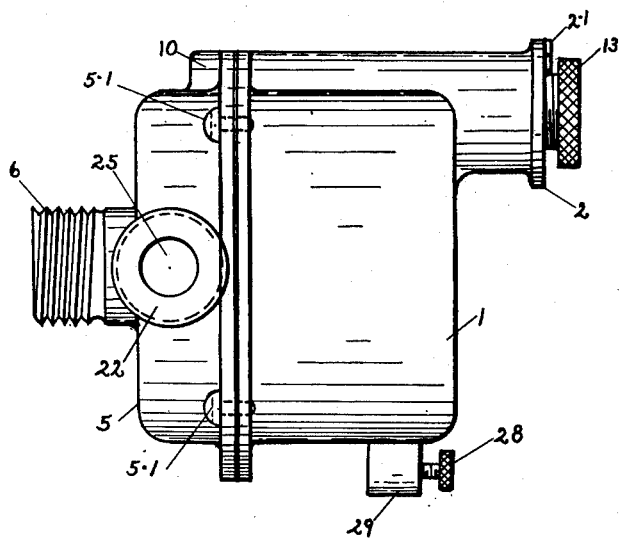
Figure 7 is a side elevation of an alternate form in which manually operable valve or faucet is mounted in the lower part of the reservoir to drain it rapidly when desired.

My apparatus is preferably formed of cylindrical housings 1 and 5 cast with flanges 3 and 23 formed integral therewith, whereby they may be securely fastened together by bolts or set screws 5.1 and with a diaphragm 21 secured between the flanges and separating the interior into a flow chamber 27 and a reservoir chamber 26.

At or near the center of the housing 5, a tubular outlet 6 is formed extending outwardly and with its outer end externally threaded to receive a sleeve to connect it with a hose or water pipe.

At one edge of the housing 5, a tubular inlet 6.1 is formed which is externally threaded to be connected by a sleeve coupling with another section of hose or water pipe.

The diaphragm 21 is flexible and is preferably made of rubber or of fibrous material impermeable to water.

At or near the center of the diaphragm on opposite sides thereof, are mounted washers 16 and 17 which may be of metal or other suitable material, and these washers are secured in close contact with the diaphragm by a bolt 20. The head of the bolt 20 is seated in a small central bore formed in a valve head or member 18 which is seated in a circular flange 17.1 formed upon the washer 17.

The other end of the bolt 20 is secured by a nut threaded thereon in the usual way. To the head of the bolt 20 is attached one end of a tension spring 8, the other end of which is held by a pin 9 mounted in the outlet 6 and extending transversely thereof.

A valve seat 7 is formed upon the inner end of the outlet 6 in which the valve member 18 may be seated to shut off the flow of water through the flow chamber 27.

The spring 8 is normally arranged to exert sufficient tension upon the valve member or head 18 to seat it securely in the seat 7 when the water pressure is equal on opposite sides of the diaphragm but to allow the valve to be opened when the diaphragm is moved to its open position by pressure of the water in the flow chamber 27 when unopposed by similar pressure in the chamber 26. Bosses 10 and 2 are formed integral with the housings 5 and 1 respectively and a small port 11 is formed in these bosses to carry water from the flow chamber to the reservoir chamber when the port is open. This port 11 is closable by a needle valve 12 carried at the inner end of a tubular stem or plug 13 which is threaded with very fine threads 15 in a bore formed in the boss 2.

A port 4 extends from the interior of the reservoir 26 to the plug 13 and a plurality of ports 4.1 are formed in the plug 13 to open the port 4 when they come into juxtaposition therewith.

When the needle valve 12 is seated in the port 11, the port 12.1 is closed thereby and at the same time the port 4 is closed by the plug 13. When the plug 13 is unscrewed to the proper distance it carries one or more of the ports 4.1 into register with the port 4 and opens a passage for the escape of water from the reservoir but when the plug 13 is unscrewed for only a short distance, it opens the port 12.1 so that water from the channel or flow chamber 27 can pass through the port 11 into the reservoir 26. The ports 11 and 12 are preferably made of small size and so fitted that the water can be so controlled as to pass either drop by drop or in extremely small quantities, thereby requiring a considerable period of time to fill the reservoir. When the reservoir is filled with the valve 11 still open, the water pressure on both sides of the diaphragm will be equal and the tension spring 8 will draw the valve or member 18 into its seat 7 and shut off the flow of water through the hose and through the flow chamber.

A dial 2.1 may be mounted upon the outer edge of the boss 2 and carry numerals to indicate the length of time necessary to fill the reservoir at the various degrees of opening of the valve 12. Thus a householder wishing to sprinkle his lawn while out driving or at his office, may set an indicator mark upon the outer end of the plug 13 at a given numeral on the dial and know that the water will flow for the length of time indicated by that numeral and will then be automatically shut off.

In the operation of my apparatus the tubular inlet 6.1 is coupled to a water supply pipe which may be a faucet mounted in the foundation of a building or may be a length of hose coupled to such a faucet. Another section of the same hose is then coupled to the tubular outlet 6. The water supply line may then be manually opened in the usual way and the water will flow into the chamber 27 and its pressure will force the diaphragm to open the valve 18 and allow the water to flow through the flow chamber 27 and out of the outlet 6. At the same time the water will dribble or flow very slowly through the port 11 and into the reservoir 26, the rate of flow depending upon the extent to which the valve 12 is opened.

At the start of the operation the reservoir 26 will be empty but when it becomes full, the pressure of the water or of the water and any air remaining therein becomes equal on both sides of the diaphragm, and the valve 18, acted upon by the spring 9, is drawn into the seat 7 thus closing off and stopping the flow of water through the flow chamber; and the valve remains closed until water is withdrawn from the reservoir so as to reduce the pressure on the reservoir side of the diaphragm when the water pressure in the chamber 27 will cause the valve 18 to open again.

Various modifications may be made in the size, proportions, materials and form of the different parts without departing from the spirit of my invention and I do not limit my claims to the precise forms shown and described.

I claim:

1. An automatic timer shut-off apparatus for a water hose or pipes, including a housing containing a flow chamber and a reservoir chamber separated by a flexible diaphragm, an inlet tube formed in the housing of the flow chamber, an outlet tube formed in the flow chamber housing spaced from the center of the diaphragm, a valve head united to the center of the diaphragm opposite the outlet tube and arranged to open and close a valve seat formed at the inner end of the outlet tube, and being secured by a bolt to washers on opposite sides of the diaphragm, a tension spring having one end attached to said bolt and its other end rigidly mounted upon a transverse pin in the outlet tube and arranged to hold the valve in closed position normally and to allow the valve to be opened by pressure of incoming water from the inlet, a tubular boss united to the housing, a port in said boss leading from the flow chamber to the reservoir, an internally threaded bore formed in said boss carrying a manually adjustable tubular plug threaded therein and open at its outer end, to the closed inner end of which a needle valve is united adapted to close or open the port in the boss as the plug is screwed in or out, ports extending through the sides of the tubular plug arranged to register with an outlet port formed in the housing of the reservoir when the plug is adjusted to certain positions whereby the water from the reservoir may be exhausted through the tubular plug.

2. A shut off appliance as described in claim 1, and a manually operable outlet faucet mounted in the reservoir.

3. Automatic timer shut-off apparatus for a water system including a housing containing a flow chamber and a reservoir chamber separated by a flexible diaphragm, a tubular inlet formed in the housing of the flow chamber for connection to a water supply pipe or hose, a tubular outlet formed in the flow chamber housing spaced from the diaphragm, for connection to an outlet pipe or hose, a valve head united to the diaphragm opposite the outlet tube by a bolt and arranged to open and close a valve seat formed at the inner end of the outlet tube, a tension spring having one end attached to said bolt and its other end rigidly mounted upon a transverse pin in the outlet tube and arranged to hold the valve in closed position normally and to allow the valve to be opened by pressure of incoming water from the inlet, a tubular boss united to the housing, a port in said boss leading from the flow chamber to the reservoir, an internally threaded bore formed in said boss carrying a manually adjustable tubular plug to the end of which a needle valve is united adapted to close or open the port in the boss as the plug is screwed in or out, ports through the sides of the tubular plug arranged to register with an outlet port formed in the housing of the reservoir when the plug is adjusted to certain open positions whereby the water from the reservoir may be exhausted through the tubular plug.

4. Automatic timer shut-off apparatus for a water system including a housing containing a flow chamber and a reservoir chamber separated by a flexible diaphragm, a tubular inlet formed in the housing of the flow chamber for connection to a water supply pipe or hose, a tubular outlet formed in the flow chamber housing spaced from the diaphragm, for connection to an outlet pipe or hose, a valve head united to the diaphragm opposite the outlet tube by a bolt and arranged to open and close a valve seat formed at the inner end of the outlet tube, resilient means attached to the outlet tube and the valve head for closing the valve, a passage through the housing from the flow chamber to the reservoir, a manually adjustable needle valve arranged to close and to open said passage, and an outlet port from the reservoir arranged to register with ports in an exhaust tube united to said needle valve to release water from the reservoir.

5. Automatic timer shut-off apparatus for a water system including a housing containing a flow chamber and a reservoir chamber separated by a flexible diaphragm, a tubular inlet formed in the housing of the flow chamber for connection to a water supply pipe or hose, a tubular outlet formed in the flow chamber housing spaced from the diaphragm, for connection to an outlet pipe or hose, a valve head united to the diaphragm opposite the outlet tube by a bolt and arranged to open and close a valve seat formed at the inner end of the outlet tube, resilient means attached to the outlet tube and the valve head for closing the valve, a passage through the housing from the flow chamber to the reservoir, a manually adjustable needle valve arranged to close and to open said passage, an outlet port from the reservoir arranged to register with ports in an exhaust tube united to said needle valve to release water from the reservoir, and a dial plate mounted on the housing adjacent the outer end of the exhaust tube arranged to indicate the time required for enough water to pass through said passage into the reservoir within a given period of time to equalize the water pressure on both sides of the diaphragm.

6. In an automatic timer shut-off apparatus for water hoses or water pipes the combination with a housing containing a flow chamber and a reservoir chamber separated by a flexible diaphragm of an inlet formed in the housing of the flow chamber at one side thereof, an outlet formed in the flow chamber housing spaced from the center of the diaphragm, a valve head bolted to the center of the diaphragm opposite the outlet tube and arranged to open and close a valve seat formed at the inner end of the outlet tube, a tension spring having one end attached to the valve head bolt and its other end rigidly mounted upon a transverse pin in the outlet tube and arranged to hold the valve in closed position normally and to allow the valve to be opened by pressure of incoming water from the inlet, a tubular boss united to the housing, a port in said boss leading from the flow chamber to the reservoir, an internally threaded bore formed in said boss carrying a manually adjustable tubular plug to the inner end of which a needle valve is united adapted to close or open the port in the boss as the plug is screwed in or out, ports through the sides of the tubular plug arranged to register with an outlet port formed in the housing of the reservoir when the plug is adjusted to certain open positions whereby the water from the reservoir may be released through the tubular plug.

7. In an automatic timer shut-off apparatus for water hoses or water pipes the combination with a housing containing a flow chamber and a reservoir chamber separated by a flexible diaphragm, or an inlet formed in the housing of the flow chamber at one side thereof, a threaded outlet tube formed in the flow chamber housing spaced from the diaphragm, a valve head united to the diaphragm opposite the outlet tube and arranged to open and close a valve seat formed at the inner end of the outlet tube and being secured by a bolt to washers on opposite sides of the diaphragm, a tension spring having one end attached to said bolt and its other end rigidly mounted in the outlet tube and arranged to hold the valve in closed position normally and to allow the valve to be opened by pressure upon the diaphragm of incoming water from the inlet, a tubular boss united to the housing, a port in said boss leading from the flow chamber to the reservoir, an internally threaded bore formed in said boss carrying a manually adjustable tubular plug threaded therein and open at the outer end, to the inner end of which a needle valve is united adapted to close or open the port in the boss as the plug is screwed in or out, a manually operable outlet faucet united to the housing of the reservoir whereby the water from the reservoir may be exhausted when the faucet is manually opened.

8. In an automatic timer shut-off apparatus for water hoses or water pipes the combination with a housing containing a flow chamber and a reservoir chamber separated by a flexible diaphragm, a tubular inlet formed in the housing of the flow chamber for connection to a water supply pipe or hose, a tubular outlet formed in the flow chamber housing spaced from the diaphragm, for connection to an outlet pipe or hose, a valve head united to the diaphragm opposite the outlet tube by a bolt and arranged to open and close a valve seat formed at the inner end of the outlet tube, a tubular boss united to the housing, a port in said boss leading from the flow chamber to the reservoir, an internally threaded bore formed in said boss carrying a manually adjustable tubular plug to the end of which a needle valve is united adapted to close or open the port in the boss as the plug is screwed in or out, ports through the sides of the tubular plug arranged to register with an outlet port formed in the housing of the reservoir when the plug is adjusted to certain open positions whereby the water from the reservoir may be exhausted through the tubular plug, resilient means attached to the outlet tube and the valve head for closing the valve, a passage through the housing from the flow chamber to the reservoir.

9. In an automatic timer shut-off apparatus for water hoses or water pipes the combination with a housing containing a flow chamber and a reservoir chamber separated by a flexible diaphragm, a tubular inlet formed in the housing of the flow chamber for connection to a water supply pipe or hose, a tubular outlet formed in the flow chamber housing spaced from the diaphragm, for connection to an outlet pipe or hose, a valve head united to the diaphragm opposite the outlet tube by a bolt and arranged to open and close a valve seat formed at the inner end of the outlet tube, a tubular boss united to the housing, a port in said boss leading from the flow chamber to the reservoir, an internally threaded bore formed in said boss carrying a manually adjustable tubular plug to the end of which a needle valve is united adapted to close or open the port in the boss as the plug is screwed in or out, ports through the sides of the tubular plug arranged to register with an outlet port formed in the housing of the reservoir when the plug is adjusted to certain open positions whereby the water from the reservoir may be exhausted through the tubular plug, resilient means attached to the outlet tube and the valve head for closing the valve, a passage through the housing from the flow chamber to the reservoir, said first mentioned valve head being bolted to washers on opposite sides of the diaphragm.

10. In an automatic timer to shut off the flow of water in a hose after a predetermined interval, the combination with a flow chamber housing, of a reservoir housing bolted thereto, a flexible diaphragm interposed between the two housings, an inlet and an outlet formed in the flow chamber housing adapted to be connected to successive sections of hose or water pipe, a valve seat formed at the inner end of the outlet, a valve head mounted upon the diaphragm arranged to occupy said seat when in a closed position and shut off the flow of water therefrom, a small passage formed in the housings to permit water to pass from the flow chamber to the reservoir, and a manually operable needle valve and tubular valve stem arranged to open or to close the passage from the flow chamber to the reservoir chamber, and to open or to close co-acting ports in the reservoir housing and in the tubular valve stem.

HARRY J. CRINER.

REFERENCES CITED

The following references are of record in the file of this patent:

UNITED STATES PATENTS

| Number | Name | Date |
|---|---|---|
| 493,774 | Howes | Mar. 21, 1893 |
| 613,623 | Dolan | Nov. 1, 1898 |
| 1,580,481 | Gavin | Apr. 13, 1926 |
| 2,388,868 | Ray | Nov. 13, 1945 |

FOREIGN PATENTS

| Number | Country | Date |
|---|---|---|
| 48,135 | Switzerland | of 1909 |
| 49,518 | Switzerland | of 1909 |